United States Patent [19]

Marchwiak et al.

[11] Patent Number: 5,339,728
[45] Date of Patent: Aug. 23, 1994

[54] COOKING RACK FOR A PAN

[75] Inventors: Zbigniew Marchwiak, Chicago; John Kapica, Cicero, both of Ill.

[73] Assignee: Handi-Foil Corporation, Wheeling, Ill.

[21] Appl. No.: 60,156

[22] Filed: May 11, 1993

[51] Int. Cl.⁵ .................. A47J 37/04; A47J 43/00; A47J 43/18

[52] U.S. Cl. .................. 99/426; 99/449; 211/181; 220/491; 220/743; 220/756; 220/912; 294/32; 294/34

[58] Field of Search .................. 99/339, 340, 426, 449, 99/450; 220/405, 491, 646, 743, 769, 756, 912; 211/181, 195, 201; 248/175; 294/32, 34

[56] References Cited

U.S. PATENT DOCUMENTS

| 629,127 | 7/1899 | Geer | 99/426 |
|---|---|---|---|
| 823,071 | 6/1906 | Nelson | 294/34 |
| 1,271,326 | 7/1918 | Kivlan | 99/449 |
| 2,212,207 | 8/1940 | Irwin et al. | 99/426 |
| 2,504,237 | 4/1950 | Weissbach | 99/426 |
| 2,549,709 | 4/1951 | Potts | 99/449 |
| 3,359,889 | 12/1967 | Young et al. | 99/426 |
| 4,200,040 | 4/1980 | MacRae | 211/181 X |
| 4,717,038 | 1/1988 | Anders | 220/912 |
| 4,741,262 | 5/1988 | Moncrief | 294/32 X |
| 4,852,760 | 8/1989 | Sarnoff et al. | 220/491 |
| 5,203,250 | 4/1993 | Fletcher . | |
| 5,203,254 | 4/1993 | Fletcher | 99/426 |

Primary Examiner—Timothy F. Simone
Attorney, Agent, or Firm—Laff, Whitesel, Conte & Saret

[57] ABSTRACT

A cooking rack is provided for use with an aluminum foil pan. The rack comprises wire segments for supporting a food item to be cooked. The wire segments define a planar array and are disposed above the pan base. The rack includes a pair of oppositely disposed handles, including a hand grip overlying the pan rim and a clamp below the pan rim for clamping the rim therebetween. The clamp is movable to a retracted position for assembly of the pan to the cooking rack and for detaching the rack from the pan.

12 Claims, 6 Drawing Sheets

COOKING RACK FOR A PAN

BACKGROUND OF THE INVENTION

Various types of pan and support frame assemblies with handles are presently on the market. In some such assemblies, a disposable, aluminum foil pan is supported on an underlying support frame. Typically a turkey, roast or the like is positioned on the pan and then becomes partially submerged in the cooking juices. Further, the bottom of the pan itself is subjected to the forces applied by the underlying frame and to possible damage therefrom.

Typical pan arrangements with underlying support frame are illustrated in U.S. Pat. Nos. 4,852,760 and 4,717,038. In some cases the frames support the pan thereon, and in other cases the frames both support the pans and connect the pans to the frames. In all cases carrying handles are provided for transporting the supported pan from place to place.

Pans having a support grill for elevating an item to be cooked above a pan for collecting juices are also known. These serve to prevent the food to be roasted from becoming partially submerged in the juices released from the food during cooking. Such support grills typically are not attached to the pan, but instead are merely placed thereon.

It would be of advantage to provide a combination cooking rack and pan which provides the advantages of a cooking rack with the disposability of an aluminum foil pan, and one in which the user has the option of disposing of the combination or reusing the cooking rack.

It would also be of further advantage to provide a combination cooking rack and pan detachably connected to each other so that the user has the option of lifting the combination (including any item placed on the rack) as a unit or of readily detaching the rack and lifting it (and any item placed thereon) and transporting such away from the pan.

Preferably, it would be desirable to provide such an improved pan and rack assembly with mechanisms that can be readily operated to effectively grip the pan with the rack and that can be operated to release the pan when desired.

The present invention provides an improved rack for assembly with a pan which can accommodate designs having the above-discussed benefits and features.

SUMMARY OF THE INVENTION

In accordance with the present invention, the rack is adapted for supporting an item to be cooked thereon while a portion of the rack lies within the pan. The rack is adapted for use with a pan, which desirably is stamped of aluminum foil, having a base, a side wall extending upwardly from the base, and a peripheral rim extending outwardly from the side wall. The cooking rack desirably includes a plurality of wire segments overlying the pan base. The wire segments together define a generally planar array for directly supporting an item to be cooked thereon.

The rack further includes a pair of handle means, each secured to the planar array at opposite sides of the array. Each handle means comprises a hand grip portion and a clamping portion movable relative to the hand grip portion. The clamping portion is movable to a first position in which the hand grip portion and the clamping portion grip the pan rim at opposite sides, and a second position in which the pan rim is readily assemblable to the cooking rack.

The clamping portion includes a top portion overlying the hand grip portion, and the clamping portion also includes a bottom portion underlying the hand grip portion. This establishes a configuration in which the hand grip portion and clamping portion are restrained against vertical separation.

In a preferred form, a part of the clamping portion also lies adjacent a first side of the hand grip portion, and another part of the clamping portion lies adjacent a second side of the hand grip portion opposite the hand grip portion first side. This establishes an arrangement wherein the clamping portion and hand grip portion are restrained against lateral separation.

Further, in a preferred form, the hand grip portion includes a retainer member, and the clamping portion includes a locking protuberance for being positioned between the pan and the retainer member to engage the retainer member when the clamping portion is in the first position. This prevents the clamping portion from sliding to the second position. Thus, the handle means is effectively locked in the clamping position to securely hold the pan to the rack. Preferably, however, the handle means is sufficiently resilient to accommodate a manipulation that effects relative movement between the locking protuberance and the retainer member so as to disengage the protuberance from the retainer member and permit subsequent sliding movement of the clamping portion to the released, second position.

In a presently most preferred form, the cooking rack includes wire segments lying adjacent the inside of the sidewall, and the handle means includes wire segments lying closely adjacent the outside of the sidewall. The wire segments cooperate to assist in gripping the pan rim at the opposite sides.

Further objects, features, and advantages of the present invention will become apparent from the following description and drawings.

DETAILED DESCRIPTION

While this invention is susceptible of embodiment in many different forms, this specification and the accompanying drawings disclose only two specific forms as examples of the invention. The invention is not intended to be limited to the embodiments so described, however. The scope of the invention is pointed out in the appended claims.

Referring now to the drawings, and first to the embodiment shown in FIGS. 1-12, a cooking rack of the present invention, designated generally by the reference numeral 12, is shown for use in association with an aluminum foil pan 10.

Pan 10 may be generally rectangular as illustrated, or may be round, oval, or square. Pan 10 comprises a base 20, a continuous side wall 22 having four side wall segments integral with the base 20 and extending upwardly at an angle from the base, and a peripheral rim 24. Rim 24 extends outwardly from the upper edge of the side wall 22 generally in a plane parallel to the base 20. The outer edge of the rim 24 may be rolled to form a bead 26 as is conventional. Typically, the aluminum foil may be of from about 0.004 inch to about 0.0075 inch in thickness.

Figure 1:
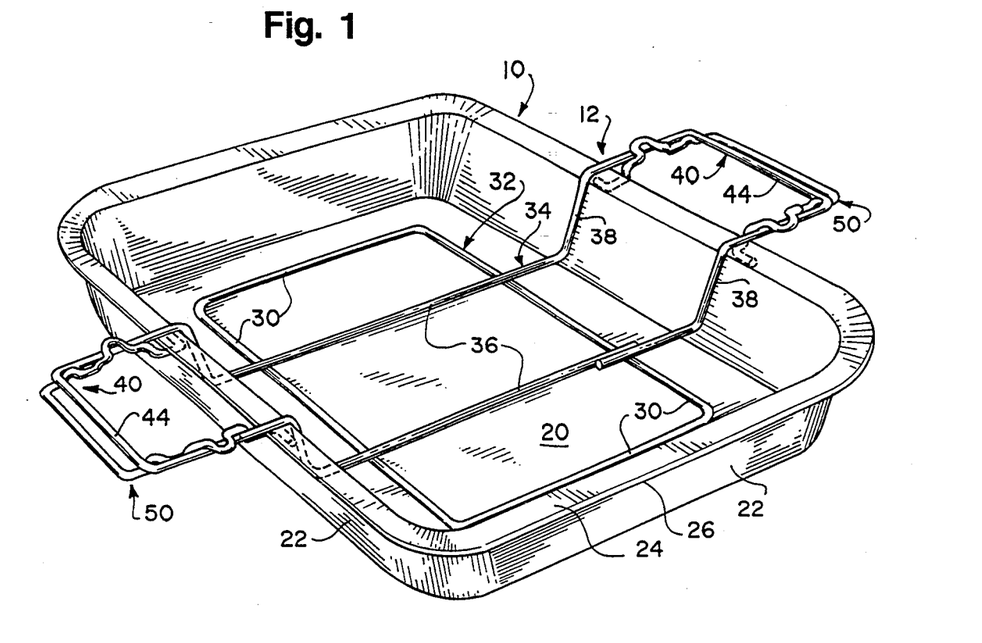
FIG. 1 is a top perspective view of a cooking rack assembled with a pan according to the teachings of the present invention.
Figure 2:
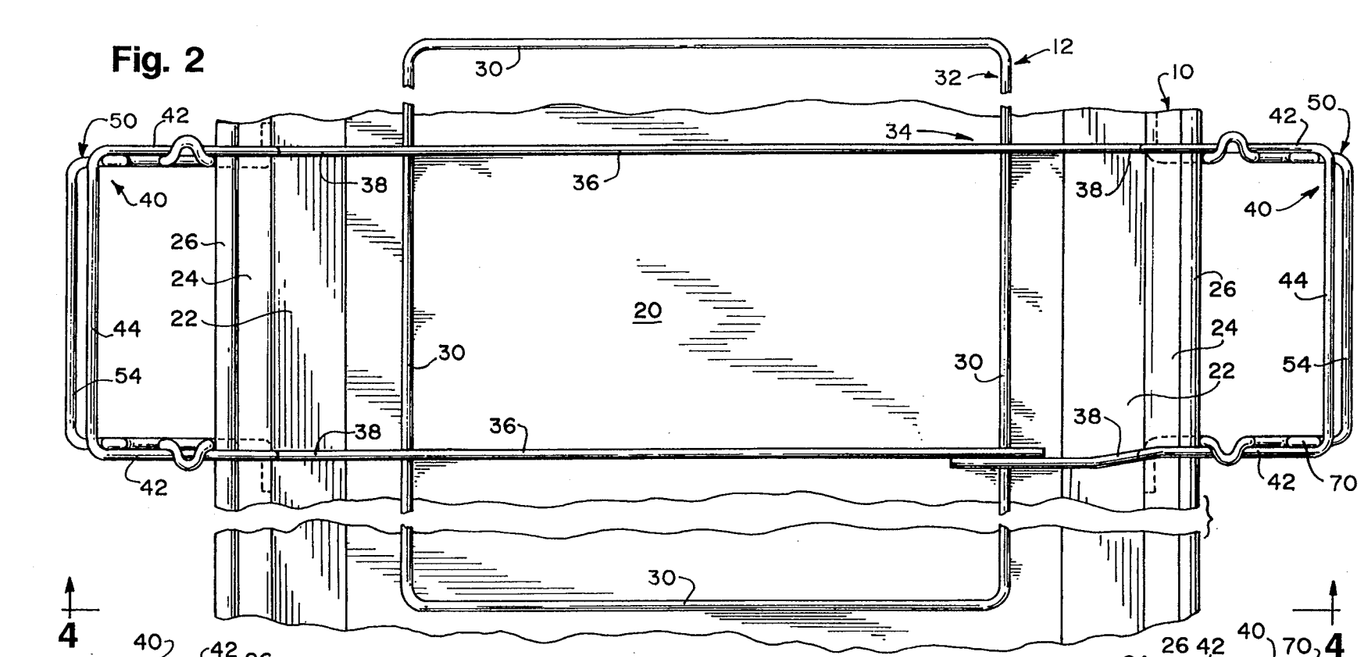
FIG. 2 is an enlarged, fragmentary, plan view of the cooking rack and pan assembly shown in FIG. 1.
Figure 3:
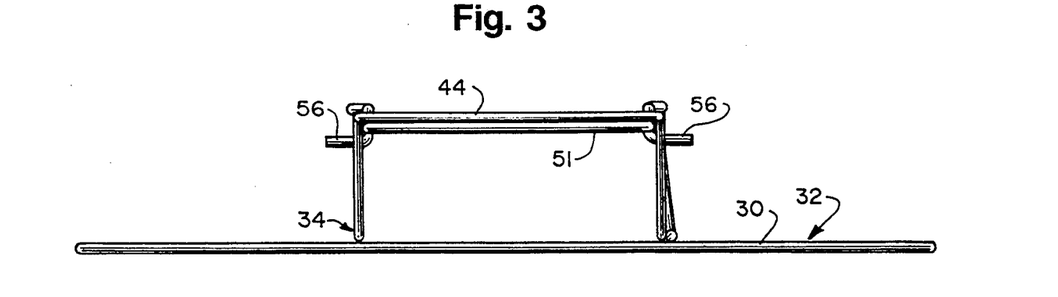
FIG. 3 is an end view of the cooking rack of FIG. 2 shown removed from the pan.

The cooking rack 12, which may be formed of steel wire, includes a generally planar array of segments for supporting a food item to be roasted or broiled directly thereon. Thus, as seen in FIG. 2, the array of segments includes four segments 30 of a first rectangular wire form frame portion 32. Frame portion 32 is welded or brazed to a second rectangular wire form frame portion 34 having two segments 36 which comprise additional segments of the planar array. The array is elevated above the base 20 of the pan (as can be seen in FIG. 4) so that juices and the like lie below the rack and the food item to be cooked supported on the rack when the rack and pan are used in combination.

Figure 4:
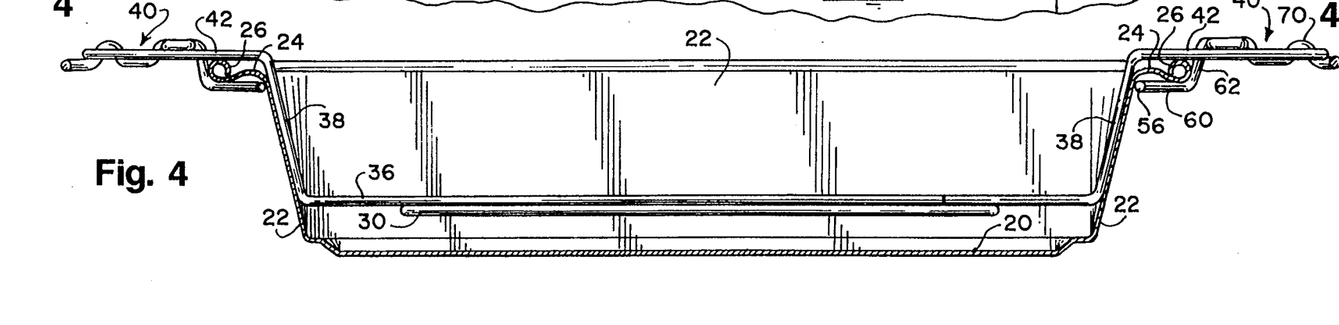
FIG. 4 is a cross-sectional view taken generally along the plane 4—4 in FIG. 3.
Figure 5:
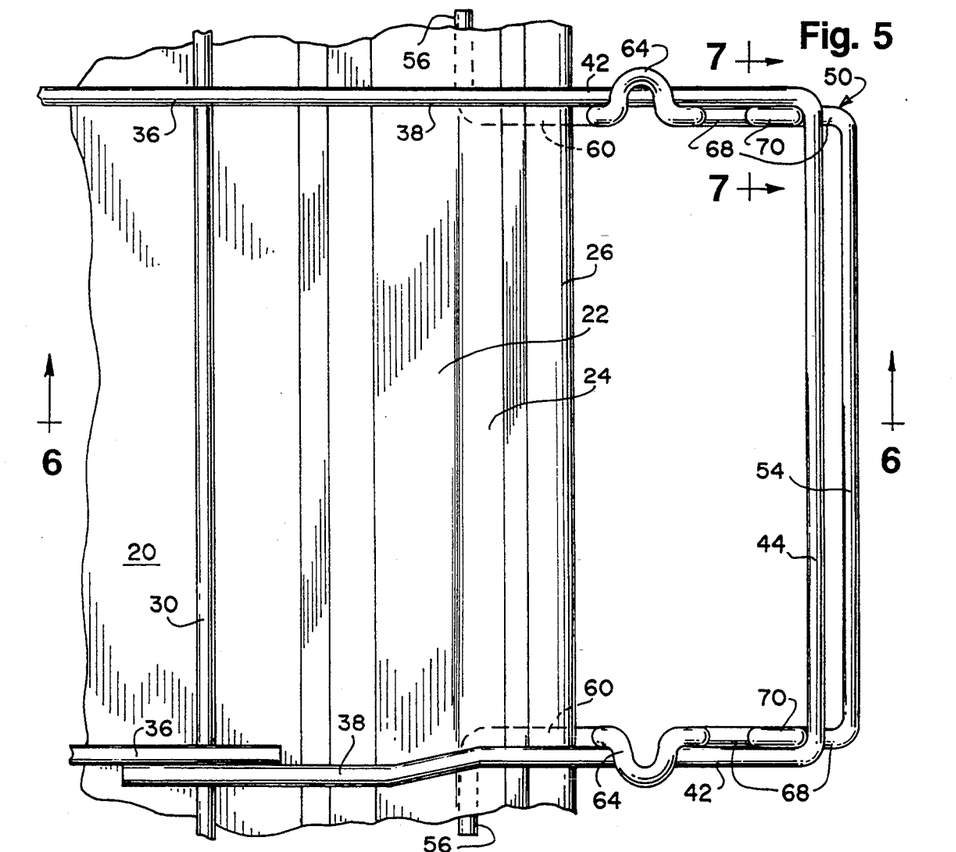
FIG. 5 is an enlarged, fragmentary view of a portion of the assembly shown in FIG. 4.
Figures 6, 7:
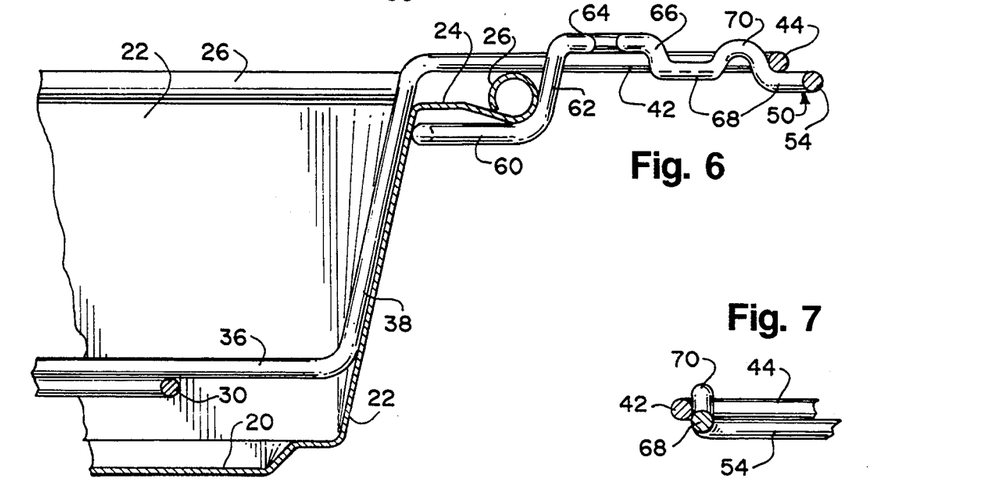
FIG. 6 is a fragmentary, cross-sectional view taken generally along the plane 6—6 in FIG. 5.
FIG. 7 is cross-sectional view taken along the plane 7—7 in FIG. 5.

As best seen in FIGS. 4 and 5, the frame portion 34, at its opposite ends, is bent upwardly to lie closely adjacent, and generally parallel to, the inner opposite surfaces of the side wall 22 to define frame segments 38. At the upper ends of frame segments 38, the rack is provided with handle means 40.

Each handle means 40 comprises a hand grip portion and a clamping portion. Each side of the hand grip portion includes a leg segment 42 which is bent outwardly at the upper end of frame segment 38 and which is generally horizontal and overlies the rim 24. Segments 42 terminate in a first hand grip, handle, or bar 44 which spans the ends of the leg segments 42.

Figure 9:
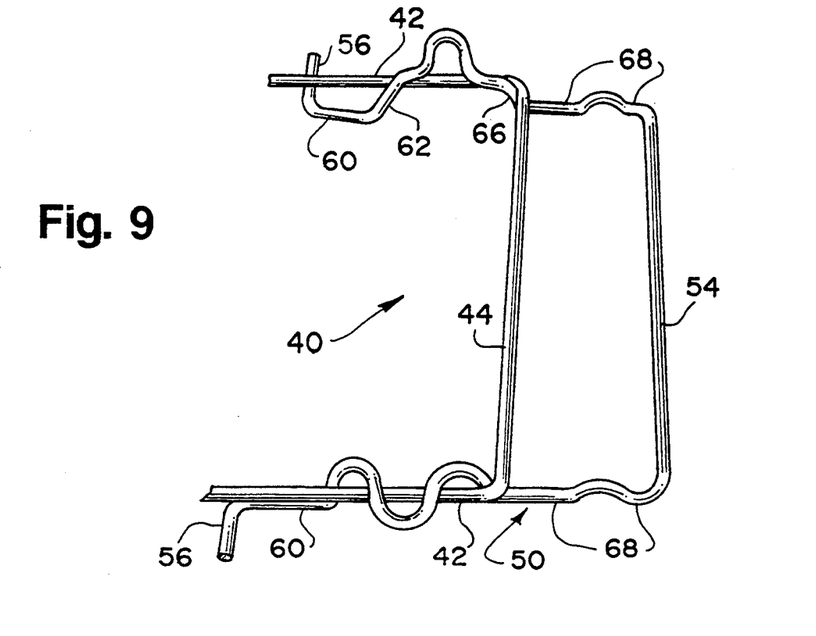
FIG. 9 is view similar to FIG. 8, but showing the handle means moved to a second, release position.
Figures 10, 11, 12:
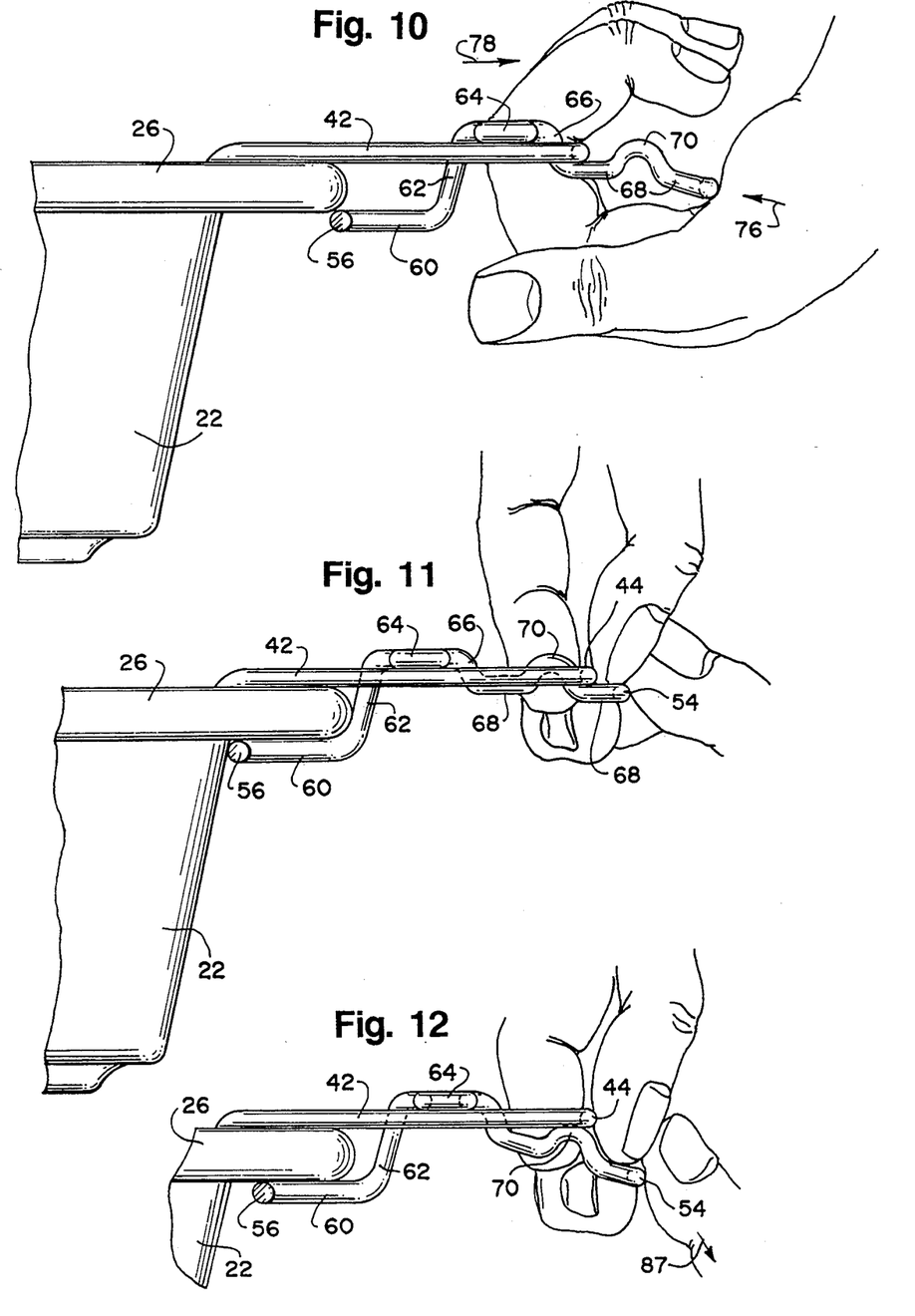
FIG. 10 is a fragmentary, side elevational view of the handle means being manipulated away from the release position toward the clamping position.
FIG. 11 is a view similar to FIG. 10, but showing the handle means in the latched, clamping position with portions being grasped at the initial stage of moving the handle means to the second, release position.
FIG. 12 is a view similar to FIG. 11, but showing the components in an intermediate position during movement from the first, latched, clamping position to the release position.

The clamping portion of the handle means 40 is movable relative to the hand grip portion between a first, latched position in which the hand grip portion and the clamping portion clampingly grip the pan (such as at the bead 26 as seen in FIG. 4) and a second position (as seen in FIGS. 9 and 10) in which the pan is released for ready separation from the cooking rack 12.

Figure 8:
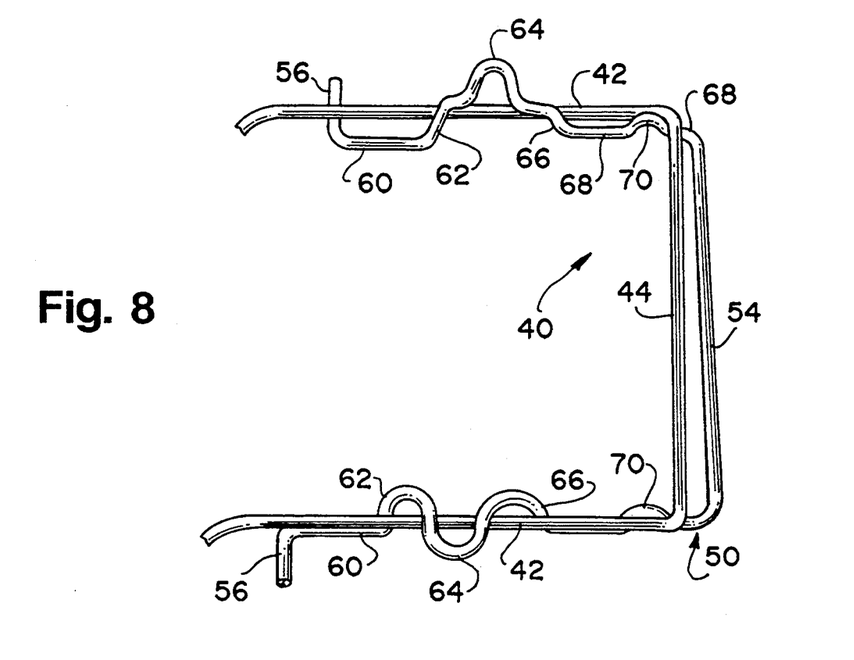
FIG. 8 is a fragmentary, top, plan view of the handle portion of the rack shown in a first, latched, clamping position.

To that end, the clamping portion comprises a generally U-shaped wire form member 50 (FIGS. 8 and 9). Wire form member 50 includes a second hand grip, bar, or handle 54 connected at each end to one of two spaced-apart arms which are each positioned adjacent one of the hand grip portion leg segments 42. As shown in FIGS. 5, 6, 8, 9, and 10, each arm has a first segment 56 at the distal end defining a first clamp member oriented generally parallel to the edge of the pan rim. A second segment 60 extends from the first segment 56 and defines a second clamp member oriented generally perpendicular to the first segment 56 below the pan rim 24. A third segment 62 (FIG. 6) extends upwardly from the second segment 60 generally outwardly of the pan rim.

The clamping portion arm also includes an arcuate fourth segment 64 (FIG. 5) extending from the third segment 62 over one of the hand grip portion leg segments 42 (FIG. 5). A fifth segment 66 (FIG. 6) extends downwardly from the fourth segment 64. A sixth segment 68 extends from the fifth segment 66 below the first hand grip 44 to the second hand grip 54.

A locking protuberance 70 is formed in each of the sixth segments for engaging the first hand grip 54 when the handle means is in the latched, clamping position illustrated in FIGS. 5-8 and 11. The clamping portion is mounted on the hand grip portion for sliding between the first, latched, clamping position (FIGS. 5-8 and 11) and a second, release position (FIGS. 9 and 10). The clamping portion and hand grip portion are restrained against vertical separation, and this restraint is imposed by the clamping portion fifth segment 64 extending over the hand grip portion leg segment 42 and by the clamping portion sixth segment 68 extending below the first hand grip 44.

The clamping portion and the hand grip portion are also restrained against lateral separation. To this end, the clamping portion third segment 62 and fifth segment 66 on each side of the handle means bear against the inside of the hand grip portion along the inside of the adjacent leg segment 42 of the hand grip portion.

Although the above-described restraint system accommodates relative sliding movement and inhibits separation of the clamping portion and hand grip portion, the clamping portion can be initially assembled to the hand grip portion by temporarily deflecting or bending the clamping portion arms inwardly as the clamping portion and hand grip portion are manipulated into proper alignment. Then, release of the temporarily deflected clamping portion arms results in the arms each properly engaging one of the hand grip portion leg segments 42.

When it is desired to close the handle means to the first, latched, clamping position, the open handle assembly can be gripped as illustrated in FIG. 10. Force is then applied with parts of the hand, or with parts of two hands, to the clamping portion and to the hand grip portion. A force is applied to the clamping portion generally in the direction indicated by the arrow 76 in FIG. 10, and a force is applied to the hand grip portion generally in the direction of the arrow 78 in FIG. 10. This moves the clamping portion clamp members 56 against the pan side wall 22. The protuberance 70 deflects downwardly to pass under the hand grip 44 and latch into position against the hand grip 44 on the other side.

Owing to the various angled segments comprising the clamping portion, the outwardly facing slope of the protuberance 70 can tightly engage the hand grip 44 while the first clamp members 56 tightly engage the pan side wall 22 because some amount of deflection or resiliency is present in the system.

The protuberance 70 functions as a locking member for engaging the hand grip 44. The hand grip 44 functions, relative to the protuberance 70, as a retainer member to retain the protuberance 70 so as to maintain the clamping portion in the first, latched position.

Further, the handle means is preferably fabricated so as to locate the first clamping members 56 and connecting second segment 60 at a predetermined distance below the arcuate fourth segment 64 so as to eliminate any clearance between the bottom of the pan rim bead 26 and the second segment 60. A relatively snug fit can be accommodated because the second segment 60 and third segment 62 can deflect somewhat as the bottom of the rim bead 26 is engaged. Thus, a spring force is typically exerted upwardly by the second segment 60 on the bottom of the bead 26 to clamp the bead 26 against the overlying hand grip portion leg segment 42 (FIG. 11).

The handle means is sufficiently resilient to accommodate relative movement between the locking protuberance 70 and the retainer member or hand grip 44 to permit the clamping portion to be moved when desired to the second, release position (FIG. 9). As illustrated in FIG. 10, the hand grip 44 can be engaged or grasped to apply a force in one direction while the clamping portion hand grip 54 is engaged or grasped to apply a force in a generally opposite direction. As illustrated in FIG. 12, the system is sufficiently resilient to permit the rear part of the clamping portion to be pulled downwardly and rearwardly (as shown by arrow 87) so as to disengage the locking protuberance 70 from the hand grip 44. This permits subsequent sliding movement of the clamping portion to the second, release position (FIG. 9).

When the rack is to be joined with a pan, the rack, with the handle assemblies released, is placed in a pan. The clamping portions 50 are then slid inwardly to the clamping position (FIG. 1) as described above. In that position, the second hand grip 54 lies very closely adjacent to the first hand grip 44, and together they serve to provide a means for lifting the rack 12, along with any item placed thereon, and for carrying and suspending the pan 10 via the rim. The positioning of the grips 44 and 54 closely adjacent to each other promotes maintenance of the clamped relationship of the rim 24 between the grip portion and the clamping portion. The maintenance of the clamped relationship is also promoted by the positions of the frame segments 38 and clamping portion free ends 56, as well as by the portions of the handle means 40 which surround the rim bead 26 as seen in FIGS. 4 and 5.

Because the clamped relationship is temporary, the clamping portion may be retracted after cooling so that the rack (and supported food item) may be lifted away from the pan and juices and moved to another suitable location for further processing, such as slicing, while leaving the pan and juices behind.

Figures 13, 15:
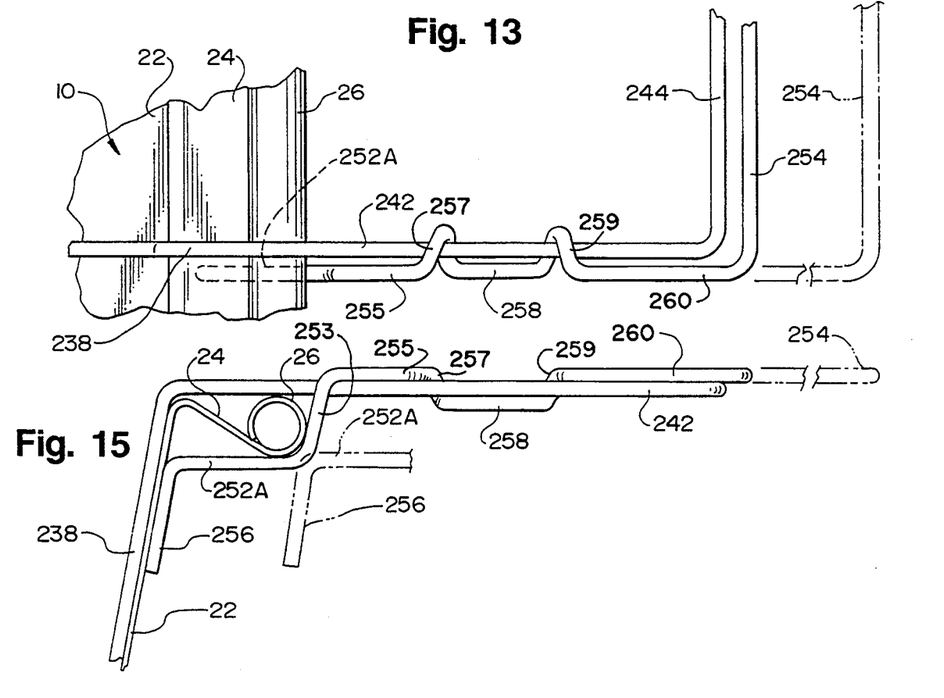
FIG. 13 is a fragmentary, plan view of a handle assembly of another embodiment of the present invention.
FIG. 15 is a side elevational view of the handle assembly shown in FIG. 13.
Figure 14:
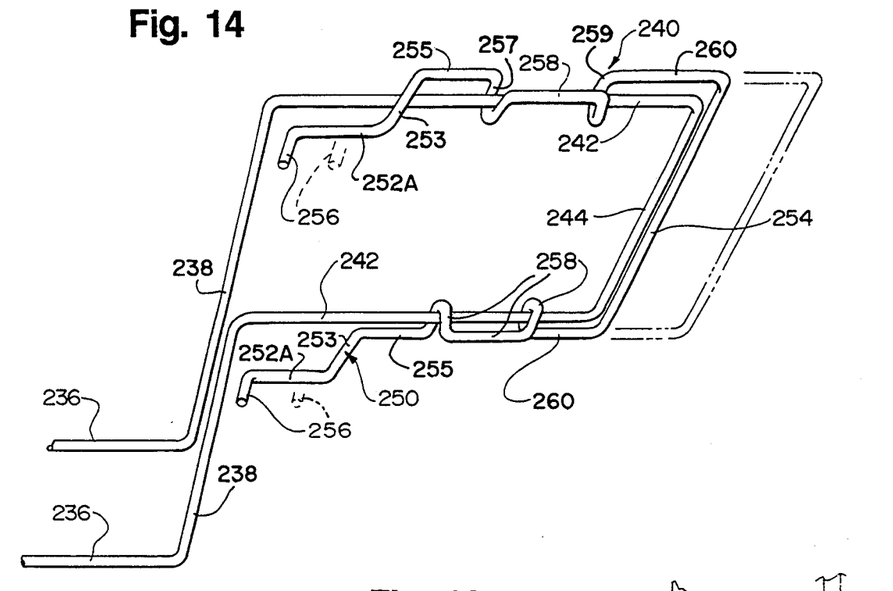
FIG. 14 is a perspective view of the handle assembly shown in FIG. 13.

In the embodiment of FIGS. 13–15, the cooking rack may be essentially the same as that of FIGS. 1–12 except for the handle means and the clamping portion. As such, the part numbers used in the embodiment of FIGS. 13–15 are the same as in FIGS. 1–12 for the pan and are in the 200 series, with the last two digits the same as in FIGS. 1–12, for the handle assembly.

As seen in FIGS. 13–15, the rack has a handle means 240 with a clamping portion 250 movable relative to the hand grip portion between (1) a first position in which the hand grip portion and the clamping portion 250 clampingly grip the rim 24 (as seen in FIG. 13) and (2) a second position (as shown in phantom in dashed lines in FIG. 13) in which a pan rim 24 can be released for ready separation from the cooking rack.

To that end, the frame includes two segments 236 which are each bent upwardly to define frame segments 238. Each side of a handle means is formed by a leg segment 242 which is bent outwardly at the upper end of each frame segment 238 and which is generally horizontal and overlies the rim 24, including the bead 26. The segments 242 terminate in a first hand grip 244 which spans the ends of the leg segments 242.

The clamping portion has a second handle 254 connected at each end to one of two, spaced-apart arms each positioned adjacent one of the hand grip portion leg segments 242. Each arm has a first segment 256 at the distal end defining a first clamp member oriented generally parallel to the pan side wall 222. A second segment 252A (FIG. 15) extends from the first segment and defines a second clamp member oriented generally below the pan rim. A third segment 253 extends upwardly from the second segment 252A generally outwardly of the pan rim. As may best be seen in FIG. 15, segments 252A are offset to define, along with segments 243, a suitable recess or space to accommodate rim bead 26.

A fourth segment 255 extends from the third segment 253 adjacent one of the hand grip portion leg segments 242. A fifth segment 257 extends over one of the hand grip leg portion segments 242. A hook-like, sixth segment 258 extends downwardly from the fifth segment 257 along side and below the hand grip portion leg segment 242. A seventh segment 259 extends from the sixth segment over the hand grip portion leg segment 242. Finally, an eighth segment 260 extends from the seventh segment 259 to the second hand grip 254.

The above-described configuration of segments forming the clamping portion embraces the adjacent leg segments 242 of the hand grip portion to accommodate sliding movement of the clamping portion relative to the hand grip portion. The segments, particularly the hook-like, sixth segments 258, define slide guides for accommodating the sliding movement and for retaining the clamping portion on the hand grip portion.

It is apparent that such slide guides or segments 258 may alternatively be formed in segments 242 for like cooperation with the arms of the clamping portion. The slide guides are sufficiently tight so that they frictionally restrain the parallel portions against free-sliding movement therebetween. In other words, although relative sliding movement is provided for, there is sufficient frictional resistance so that moderate force is required to force the parts of the handle means to slide relative to each other.

When the cooking rack of the embodiment of FIGS. 13–15 is assembled as described, the rack is adapted to be joined with a pan 10 in the same manner described regarding the embodiment of FIGS. 1–12. Thus, when the rack of FIGS. 13–15 is to be joined with a pan, such as a pan 10, the rack is dropped or placed in a pan 10. The clamping portions 250 are then slid inwardly (from the dashed, phantom line position of FIG. 13 to the full line position of FIG. 13) to grip the rim 24 at each side of the pan 10. In that position, the second hand grip 254 lies very closely adjacent to the first hand grip 244, and together they serve to provide a means for lifting the rack and any item placed thereon and for carrying and suspending the pan 10 via the rim. The closely adjacent positioning of the hand grips 244 and 254 promotes maintenance of the clamped relationship of the rim 24 between the grip portion and the clamping portion. The maintenance of the clamped relationship is also promoted by the positions of the frame segments 238 and free ends 256, as well as by the portions of the handle means which surround the rim bead 26 as best seen in FIG. 15.

It will also be apparent that the clamped relationship may be temporary. Thus, after cooking, the clamping portion may be retracted so that the rack (and supported food item) may be lifted away from the pan and juices for carrying to another suitable location for further processing, such as slicing, while leaving the pan and juices behind.

From the foregoing, it will be apparent to those skilled in the art that other equivalent structures may be made without departing from the spirit and scope of the present invention. Accordingly, the invention is not intended to be limited except insofar as may be necessary in light of the appended claims.

What is claimed is:

1. A cooking rack for supporting an item to be cooked thereon during cooking and for suspending by its rim a pan comprising a base, a side wall extending upwardly from the base and a peripheral rim extending outwardly from the side wall, said cooking rack comprising
    a plurality of wire segments for overlying a pan base and together defining a generally planar array for directly supporting an item to be cooked thereon,
    a pair of handle means, each secured to said planar array at opposite sides of said array,
    each said handle means comprising a hand grip portion and a clamping portion movable relative to said hand grip portion between a first position in which said hand grip portion and said clamping portion are adapted to grip a pan rim at said opposite sides, and a second position in which a pan rim is readily assemblable to said cooking rack, said clamping portion including a top portion overlying said hand grip portion and a bottom portion underlying said hand grip portion whereby said clamping portion and said hand grip portion are restrained against vertical separation.

2. The rack in accordance with claim 1 in which part of said clamping portion lies adjacent a first side of said hand grip portion, and another part of said clamping portion lies adjacent a second side of said hand grip portion opposite said hand grip portion first side whereby said clamping portion and said hand grip portion are restrained against lateral separation.

3. The rack in accordance with claim 1 in which said clamping portion is a bent wire member engaged with said hand grip portion to prevent vertical and lateral separation of said clamping portion from said hand grip portion.

4. The rack in accordance with claim 1 in which said clamping portion has a distal end including an elongate clamp member oriented to be parallel to the edge of said rim and positioned below said rim against said side wall when said pan is assembled with said rack and said clamping portion is in said first position.

5. The rack in accordance with claim 1 in which
    said clamping portion is mounted for sliding movement along a plane on said hand grip portion between said first position and said second position in which said clamping portion is outwardly retracted;
    said hand grip portion includes a retainer member; and
    said clamping portion includes a locking protuberance for being positioned between said pan and said retainer member to engage said retainer member when said clamping portion is in said first position and thereby prevent said clamping portion from sliding to said second position, said handle means being sufficiently resilient to accommodate relative movement between said locking protuberance and said retainer member out of said sliding plane to disengage said protuberance from said retainer member and permit subsequent sliding movement of said clamping portion to said second position.

6. The rack in accordance with claim 5 in which said retainer member is a segment of wire that is spaced outwardly of said pan rim, that is generally parallel to said pan rim, and that also functions as a handle portion by which said rack can be lifted.

7. The rack in accordance with claim 5 in which said protuberance has front and rear camming surfaces for engaging said retainer member.

8. The rack in accordance with claim 1 in which said hand grip portion is generally U-shaped and has two spaced-apart leg segments each secured at one end to said planar array and each connected at the other end to a first handle portion.

9. The rack in accordance with claim 8 in which
    said clamping portion has a second handle portion connected at each end to one of two, spaced-apart arms each positioned adjacent one of said hand grip portion leg segments; and
    each said arm has
    (a) a first segment at the distal end defining a first clamp member oriented generally parallel to the edge of said pan rim;
    (b) a second segment extending from said first segment and defining a second clamp member oriented generally perpendicular to said first segment below said pan rim; and
    (c) a third segment extending upwardly from said second segment generally outwardly of said pan rim.

10. The rack in accordance with claim 8 which each said clamping portion arm has
    (a) an arcuate fourth segment extending from said third segment over one of said hand grip portion leg segments;
    (b) a fifth segment extending downwardly from said fourth segment;
    (c) a sixth segment extending from said fifth segment below said first handle portion to said second handle portion; and
    (d) a locking protuberance on said sixth segment for engaging said first handle portion.

11. The rack in accordance with claim 8 in which
    said clamping portion has a second handle portion connected at each end to one of two, spaced-apart arms each positioned adjacent one of said hand grip portion leg segment; and each said arm has
- (a) a first segment at the distal end defining a first clamp member oriented generally parallel to the pan side wall;
- (b) a second segment extending from said first segment and defining a second clamp member oriented generally below said pan rim;
- (c) a third segment extending upwardly from said second segment generally outwardly of said pan rim;
- (d) a fourth segment extending from said third segment adjacent one of said hand grip portion leg segments;
- (e) a fifth segment extending over one of said hand grip portion leg segments;
- (f) a hook-like, sixth segment extending downwardly from said fifth segment along side said one hand grip portion leg segment and below said one hand grip portion leg segment;
- (g) a seventh segment extending from said sixth segment over said one hand grip portion leg segment; and
- (h) an eighth segment extending from said seventh segment to said second handle portion.

12. The rack in accordance with claim 1 in which
said clamping portion is mounted for sliding movement generally along a plane on said hand grip portion between said first position and said second position in which said clamping portion is outwardly retracted; and
said hand grip portion and said clamping portion cooperatively define releasable latch means for effecting engagement between said hand grip portion and said clamping portion when said clamping portion is in said first position and thereby prevent said clamping portion from sliding to said second position, said handle means being sufficiently resilient to accommodate relative vertical movement between parts of said hand grip portion and said clamping portion out of said sliding plane to release said latch means and disengage said hand grip portion and said clamping portion and permit subsequent sliding movement of said clamping portion to said second position.

* * * * *